(12) United States Patent
Claeys

(10) Patent No.: US 9,114,873 B2
(45) Date of Patent: Aug. 25, 2015

(54) CABLE-CUTTER DEVICE

(75) Inventor: Gérald Claeys, Meyreuil (FR)

(73) Assignee: Airbus Helicopters, Marignane Cedex (FR)

( * ) Notice: Subject to any disclaimer, the term of this patent is extended or adjusted under 35 U.S.C. 154(b) by 1487 days.

(21) Appl. No.: 12/560,936

(22) Filed: Sep. 16, 2009

(65) Prior Publication Data
US 2010/0064523 A1 Mar. 18, 2010

(30) Foreign Application Priority Data
Sep. 17, 2008 (FR) ...................................... 08 05105

(51) Int. Cl.
*B64C 27/00* (2006.01)
*B26D 5/38* (2006.01)
*B26D 3/08* (2006.01)
*B63G 7/04* (2006.01)
*B26D 11/00* (2006.01)
*B60R 19/54* (2006.01)

(52) U.S. Cl.
CPC ................ *B64C 27/006* (2013.01); *B26D 3/08* (2013.01); *B26D 5/38* (2013.01); *B26D 11/00* (2013.01); *B26D 2011/005* (2013.01); *B60R 19/545* (2013.01); *B63G 7/04* (2013.01)

(58) Field of Classification Search
CPC .............. B26D 5/38; B26D 1/02; B26D 1/26; B26D 1/30; B26D 1/56; B26D 3/08; B26D 11/00; B26D 2011/005; B60R 19/545; B64C 27/006; B63G 7/04
USPC ............. 83/49, 370, 580, 857, 865, 950, 308, 83/438, 440, 440.1, 444, 596, 928, 863, 83/886, 887; 114/221 A; 244/121, 1 R, 244/129; 30/90.1, 90.3, 233, 289; 280/762; 405/156
See application file for complete search history.

(56) References Cited

U.S. PATENT DOCUMENTS

| 1,273,287 | A |   | 7/1918 | Stankewicz |
|-----------|---|---|--------|------------|
| 1,708,016 | A | * | 4/1929 | Grunig ............................ 83/308 |
| 2,396,686 | A | * | 3/1946 | Craig ......................... 114/221 A |
| 2,396,731 | A | * | 3/1946 | Wiener ....................... 114/221 A |
| 2,402,057 | A | * | 6/1946 | Kottmann .................. 114/221 A |
| 2,420,987 | A | * | 5/1947 | Temple, Jr. ................ 114/221 A |

(Continued)

FOREIGN PATENT DOCUMENTS

| DE | 448 928 | * 6/1929 | ............ B60R 19/545 |
| FR | 2 443 309 A1 | 7/1980 | |
| GB | 2 075 940 A | 11/1981 | |

OTHER PUBLICATIONS

French Search Report, dated May 12, 2009, from the corresponding French application.

*Primary Examiner* — Clark F Dexter
(74) *Attorney, Agent, or Firm* — Brooks Kushman P.C.

(57) ABSTRACT

A device (10) for cutting through cables (6) is provided with a jaw (30) having a top portion (31) and a bottom portion (32) which together define a notch (35). The device (10) is provided with a first and second stationary and co-operating sharp edges (33, 34) arranged at a downstream end (35') of the notch (35) so as to form an angle between each other. The device further includes a rotary blade (50) provided with a body (51) having a tapering side (52), the body (51) being fastened to one of the portions (31, 32) of the jaw (33) so that the tapering side (52) is arranged in the notch (35) upstream from the first and second sharp edges (33, 34).

18 Claims, 2 Drawing Sheets

(56) References Cited

U.S. PATENT DOCUMENTS

| | | | |
|---|---|---|---|
| 3,799,017 A * | 3/1974 | Halligan | 83/167 |
| 3,915,043 A * | 10/1975 | Smith et al. | 83/362 |
| 4,215,833 A | 8/1980 | Chan | |
| 4,696,234 A * | 9/1987 | Kaltmann et al. | 102/308 |
| 4,826,103 A * | 5/1989 | McKown | 244/1 R |
| 6,508,152 B1 * | 1/2003 | Kern et al. | 83/76 |
| 6,708,591 B1 * | 3/2004 | Kern et al. | 83/76 |
| 6,769,336 B2 * | 8/2004 | Kern et al. | 83/76 |
| 7,150,426 B2 * | 12/2006 | Huttunen | 242/487.9 |

* cited by examiner

CABLE-CUTTER DEVICE

FIELD OF THE INVENTION

The present invention relates to a cable-cutter device for an aircraft, and more particularly an aircraft of the helicopter type. The invention thus lies in the technical field of aircraft cable-cutters.

BACKGROUND OF THE INVENTION

Thus, document U.S. Pat. No. 1,273,287 forms part of the technological background and not part of the technical field of the invention. That document describes a cable cutter suitable for being arranged on a bayonet and making use only of a pivoting knife in order to cut through said cables.

Cables, such as telephone cables or high-voltage electricity cables, constitute a significant danger for helicopters.

Because of the kinds of mission that they perform, helicopters fly at low altitude and run the risk at any time of coming into collision with a cable. Even if the pilot of the helicopter pays particular attention, it remains difficult to see a cable having a diameter of 1 centimeter (cm) or 2 cm, for example.

In forward flight, the helicopter thus runs the risk of striking a cable. Under such circumstances, the cable slides along the cockpit and then comes into contact with the rotor mast or else with the landing gear, and that can lead to a catastrophic situation.

It should be observed that most accidents that occur during low-altitude flights result from a helicopter colliding with a suspended cable.

Helicopter manufacturers have thus implemented devices suitable for cutting a cable while in flight in order to protect their helicopters in the event of an accident.

Document U.S. Pat. No. 4,407,467 describes a first device provided with a structure at the front of the helicopter, said structure supporting a plurality of explosive charges.

When the helicopter strikes a cable, the cable slides along the structure until it reaches an explosive charge that explodes on coming into contact therewith, thereby cutting through the cable.

That first device fulfils requirements; however it can be dangerous, since metal elements might damage the helicopter at the time of the explosion.

In addition, the carrier structure is found to be heavy, bulky, and not very aerodynamic.

Document WO 2006/068507 discloses a second device for cutting cables.

That second device recommends using pairs of electrodes mounted on the fuselage to cut through a cable, if any.

That second device differs completely from the first device, but it requires a constricting electrical installation.

Furthermore, that second device tends to present risks for personnel on the ground close to the aircraft.

Document U.S. Pat. No. 4,826,103 discloses a third device.

That third device includes a jaw provided with a top portion and a bottom portion that define a notch. That third device is also provided with a knife that is set into movement by an explosive charge to cut through a cable in the notch.

The presence of an explosive makes using that third device difficult or even dangerous, and also requires maintenance that is relatively constraining.

Finally, document FR 2 443 309 discloses a fourth device for cutting a cable under mechanical tension, said device comprising a pair of stationary sharp edges that co-operate with each other.

Those two sharp edges are then arranged in such a manner as to form an angle between them that produces a sloping plane effect or wedge effect while also presenting a cutting face to a cable that comes into contact with said sharp edges.

That fourth device is very effective for cables of medium diameter, of the order of 11 millimeters (mm), and/or suitable for withstanding a maximum force of about 80,000 newtons (N).

Similarly, that fourth device is effective at low speeds, lying in the range 20 kilometers per hour (km/h) to 120 km/h, but it is of limited effectiveness at faster or slower speeds that lie outside said range.

OBJECT AND SUMMARY OF THE INVENTION

An object of the present invention is thus to propose a device suitable for cutting through a cable of large diameter, of the order of 20 mm, for example, with this being a function of the relative dimensions of the various components of the innovation. Furthermore, an object of the invention is also to be effective under extreme conditions of speed in order to have an effective application in the field of aviation.

According to the invention, a cable-cutter device for cutting a cable that is in a state of mechanical tension is provided with a jaw that includes a top portion and a bottom portion that together define a notch. The device is also provided with first and second stationary and co-operating sharp edges arranged at a downstream end of the notch in such a manner as to form an angle between each other, so as to produce a sloping plane effect or a wedge effect while presenting a cutting edge to a cable that comes into contact with said first and second sharp edges.

The device is remarkable in that it includes a rotary blade provided with a body having a sharp tapering side, said body being fastened to one of the portions of the jaw, its top portion or its bottom portion, so that the tapering side is arranged in the notch upstream from the first and second sharp edges, i.e. between the upstream end of the notch and the first and second sharp edges.

It should be observed that the terms "upstream" and "downstream" are defined in the present text relative to the forward direction of cable movement in the notch of the jaw, a cable moving in particular along the notch from its "upstream" end towards its "downstream" end.

Consequently, in a first stage, a cable of a suitable diameter begins by coming into contact with the tapering side of the rotary blade.

The rotary blade then begins to turn under pressure from the cable, which thus becomes compressed between the rotary blade and the portion of the jaw to which said rotary blade is not fastened.

This passage of the cable against the rotary blade can sometimes suffice to cut through it. Otherwise, after turning through a certain angle, the rotary blade ends up by releasing the cable, which continues its travel.

In the second stage, the cable then reaches the first and second sharp edges located at the end of the notch. Since the cable has already been partially nicked by the rotary blade, the first and second sharp edges can cut through it without difficulty.

Thus, the invention makes it possible to cut through a cable of large size, of the order of 20 mm for example, without difficulty and independently of the forward speed of the aircraft fitted with the cable-cutter device.

The device of the invention also includes one or more of the following additional characteristics.

Thus, the first and second sharp edges are placed in the notch in line with the rotary blade so that the cable comes into contact with the first and second sharp edges after being in contact with the rotary blade.

Furthermore, since the rotary blade is fastened to one of the portions of the jaw of the device, at least a fraction of the tapering side of said rotary blade presents an angle relative to the sliding surface of the other portion of the jaw on which the cable is sliding.

This ensures that the cable causes the rotary blade to turn.

For example, the tapering side then includes a straight zone followed by a circularly arcuate zone, the straight zone being situated upstream from the circularly arcuate zone.

In order to optimize its size, the body of the rotary blade may be arranged at least in part in a setback in one of the portions of the jaw, the top portion or the bottom portion.

Furthermore, the body is advantageously fastened to one of the portions of the jaw, e.g. by a fastener pin, with the body being suitable for turning thereabout.

In a variant of the invention, the body projects in part into the notch in order to present an obstacle upstream from the tapering side of the rotary blade suitable for coming into contact with a cable.

A cable of large size, e.g. having a diameter greater than 20 mm, will then push the rotary blade via said obstacle without being compressed.

Optionally, the device also includes return means for the rotary blade, suitable for holding said rotary blade in an initial position in the absence of any cable.

Thus, at rest, the rotary blade is held in an initial position by the return means.

When a cable pushes the rotary blade, the rotary blade turns and moves away from its initial position. In contrast, when the cable is no longer in contact with the rotary blade and is heading towards the first and second sharp edges, the return means push the rotary blade back into its initial position.

Since the body is fastened to one of the portions of the jaw, the top portion or the bottom portion, the return means comprise a spring arranged between the body of the rotary blade and the portion of the jaw to which the body is fastened.

Furthermore, the device includes at least one deflector suitable for directing a cable towards the notch of the jaw so as to guide a cable towards said notch.

The deflector projects towards the front of the device, so as to be directed towards the front of the aircraft fitted with the invention.

Advantageously, a leading edge of the deflector presents cutter means.

On sliding along the deflector, the cable is either cut through or else is nicked by the cutter means.

The cutter means may then comprise a stationary blade, optionally provided with a sharp edge in the form of waves presenting a succession of projections and recesses.

BRIEF DESCRIPTION OF THE DRAWINGS

The invention and its advantages appear in greater detail from the context of the following description of embodiments given by way of illustration with reference to the accompanying figures, in which.

Elements present in more than one of the figures are given that the same, unchanging references in each of them.

MORE DETAILED DESCRIPTION

Figure 1:
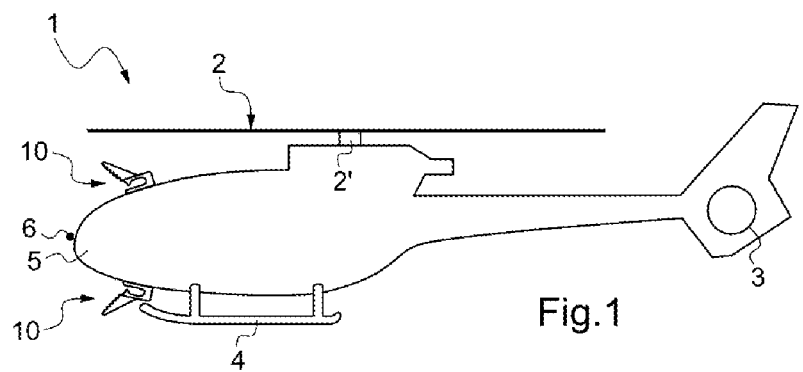
FIG. 1 is a diagrammatic section of a helicopter fitted with a cable-cutter device.

FIG. 1 shows an aircraft, more precisely a helicopter 1, provided with a main lift and propulsion rotor 2 and with a tail rotor 3.

The main rotor 2 is driven by an engine installation via its rotor mast 2'.

The helicopter 1 also includes skid landing gear 4.

In order to ensure that the rotor mast 2' and the landing gear 4 are not struck by a suspended cable 6 during forward flight, the helicopter 1 is fitted with two cable-cutter devices 10 arranged above and below its cockpit 5.

Figure 2:
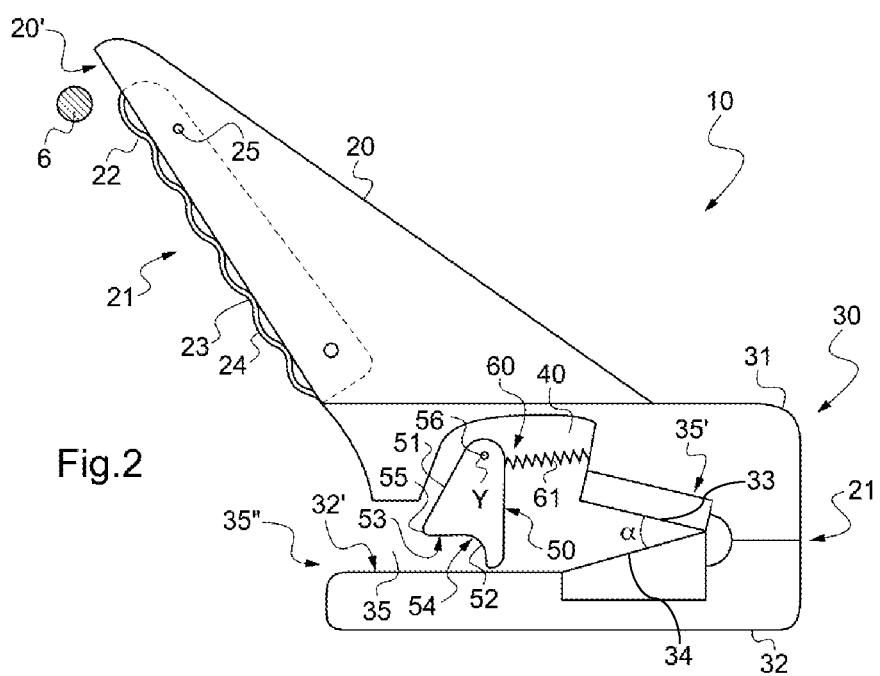
FIG. 2 is a section of a cable-cutter device of the invention in an initial position.

FIG. 2 shows the cable-cutter device 10 of the invention.

This device 10 for cutting cables 6 has a jaw 30 comprising a top portion 31 and a bottom portion 32 interconnected at one end only.

Thus, the top and bottom portions 31 and 32 define and surround a notch 35.

The notch 35 is blind in that it presents an upstream end 35" that is open to the outside, and a downstream end 35' that is closed by an end wall. It should be observed that a zone Z1 of fastening between the top portion 31 and the bottom portion 32 represents the end of the notch 35.

It should be observed that the jaw, shown diagrammatically, presents the top portion 31 and the bottom portion 32 that are distinct from each other, being connected together at one of their ends in the fastener zone Z1. Nevertheless, it should readily be understood that the top and bottom portions may be made out of a single block of material so as to constitute a single piece.

In order to be capable of cutting through a cable 6, the jaw has first and second sharp edges 33 and 34 that are secured respectively to the top and bottom portions 31 and 32 so as to present an angle $\alpha$ between them.

These first and second sharp edges project into the notch 35, more precisely at the downstream end 35' of the notch 35, and thus in the vicinity of the end of the notch 35.

In order to optimize the first and second sharp edges 33 and 34, the person skilled in the art can refer to the existing literature, and in particular to the above-described prior art.

In addition to the first and second sharp edges 33 and 34, the jaw 30 of the cable-cutter device 10 is provided with a rotary blade 50.

This rotary blade 50 comprises a body 51 having a tapering side 52, i.e. a side with a sharp section.

Consequently, the body 51 is inserted in a setback 40 formed in one of the portions of the jaw 30, i.e. in the top portion 31 of the jaw 30 in the embodiment shown in FIG. 2.

The body 51 is then fastened to the top portion 31 of the jaw 30 via a pivot pin or fastener pin 56 that passes through said top portion 31 and said jaw. Thus, the rotary blade 50 is suitable for turning about the pivot axis a pivot pin 56 extending in a direction Y that is substantially normal to the notch 35, i.e. in the direction of the thickness of the jaw.

It can be seen that since the body 51 of the rotary blade 50 is fastened inside the setback 40 in the top portion of the jaw 30, the tapering side 52 is placed in the notch 35, at least before a cable comes into contact with the device 10, and thus when the rotary blade 50 is in its initial position as shown diagrammatically in FIG. 2.

More precisely, the rotary blade 50 is arranged in the notch 35 upstream from the first and second sharp edges 33 34, these first and second sharp edges being situated to extend the rotary blade 50.

To keep the rotary blade 50 in its initial position when there are no cables, the jaw 30 includes return means 60.

These return means possess a spring 61 arranged in the setback 40, which spring is secured to the body 51 of the rotary blade and to the top portion 31 of the jaw to which the body 51 is fastened.

The spring 61 of the return means exerts a force on the body 51 to keep the rotary blade 50 in its initial position, i.e. a position where the tapering side 52 is directed towards the upstream end 35" of the notch 35 and not towards the first and second sharp edges 33 and 34.

In order to optimize the device 10, and in order to guarantee that it operates properly, at least a portion of the tapering side 52 of the rotary blade 50 presents an angle relative to the sliding surface 32' of the portion of the jaw to which the body 51 of the rotary blade is not fastened.

For example, the tapering side 52 then presents, in succession going from the upstream end 35" of the notch 35 towards its downstream end 35': a straight zone 53 followed by a zone 54 that is substantially circularly arcuate.

Finally, it can be observed that the body 51 projects from the setback 40 in the notch 35 so that the front portion of the tapering side constitutes an obstacle 55 upstream from said tapering side 52.

The cable-cutter device 10 thus possesses the jaw 30 provided in its notch 35 with the rotary blade 50 suitable for nicking the cable 6, or indeed for cutting through it, and then in line therewith, the first and second sharp edges 33, 34 that present an angle α between each other.

Nevertheless, in order to guide the cable 6 towards its notch 35, the device 10 is advantageously provided with a deflector 20 directed towards the front of the helicopter 1.

Thus, the deflector 20 guides a potential suspended cable towards the notch 35 of the jaw 30, so that the cable is cut through.

The presence of optional cutter means 21 should also be observed, which means are arranged on the leading edge 20' of the deflector. The purpose of these cutter means is either to cut through the cable or else to nick it, depending on the physical characteristics of said cable.

With reference to FIG. 2, the cutter means 21 may be constituted by a stationary blade, partially setback in a notch of the deflector 20 and fastened to said deflector 20 using conventional means 25 and also provided with a sharp edge 22. As an option, and with reference to FIG. 2, this cutting edge 22 may comprise a succession of recesses 23 and projections 24.

It is now appropriate to explain how the device 10 operates in the presence of a cable.

Three situations need to be distinguished as a function of the diameter of the cable 6. Thus, the operation of the device 10 is studied with a cable of small diameter, i.e. a diameter of less than 11 mm, with a cable of medium diameter i.e. lying in the range of 11 mm to 20 mm, and then with a cable of large diameter, i.e. greater than 20 mm, all of these values being given by way of example as a function of the relative dimensions of the various components of the invention.

Whatever its diameter, the deflector 20 guides the cable 6 towards the notch 35 of the jaw. Nevertheless, since the deflector 20 includes cutter means 21, the cable 6 will either be cut through before it reaches the notch 35, or else it will be nicked.

Figure 3:
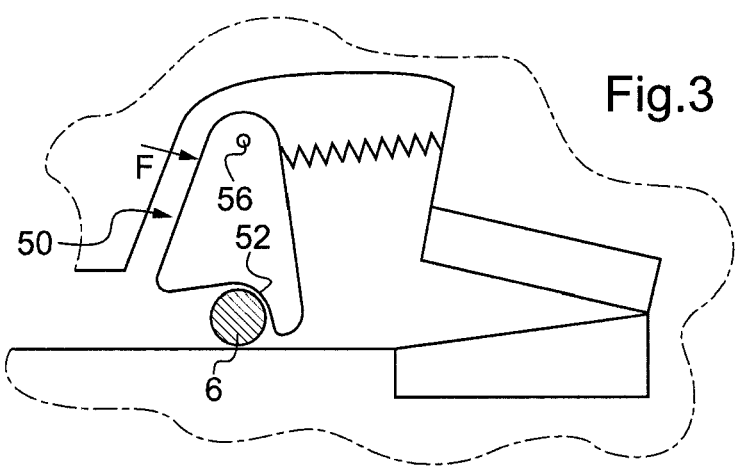
FIGS. 3 to 5 are sections explaining how a cable-cutter device of the invention operates.
Figure 4:
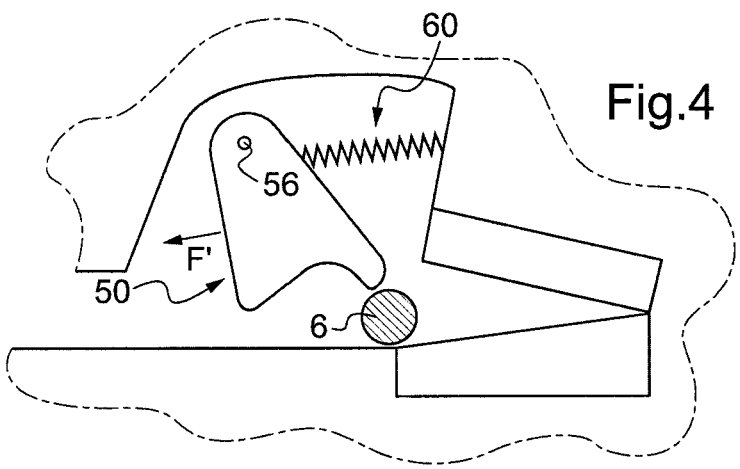
Figure 5:
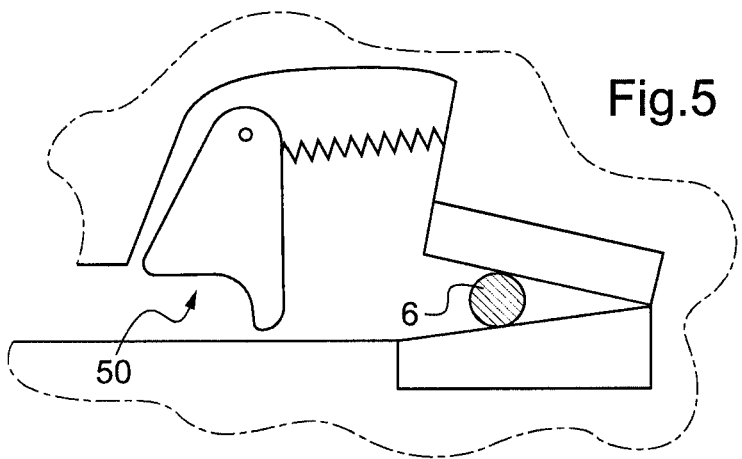

FIGS. 3 to 5 show the operation of the device 10, and above all of its jaw 30 in association with a cable 6 of medium diameter.

Once in the notch 35, the cable 6 comes into contact with the tapering side 52 of the rotary blade 50.

With reference to FIG. 3, this rotary blade 50, under thrust from the cable 6, turns in a counterclockwise direction as represented by arrow F. The rotary blade 50 then leaves its initial position shown diagrammatically in FIG. 2.

The rotary blade 50 then compresses the cable 6 between the tapering side 52 and the sliding surface 32' of a bottom jaw 32. It should be understood that as the cable 6 advances along the notch 35, the compression of the cable 6 increases up to a maximum, and then decreases.

During this compression stage, the rotary blade 50 shears the cable 6 strongly and possibly even cuts through it.

With reference to FIG. 4, if the cable 6 is not cut through at the end of the compression stage, it continues its travel and is therefore no longer compressed by the rotary blade 50.

The rotary blade 50 is no longer thrust by the cable 6 and therefore returns to its initial position under drive from the return means 60 forcing it to turn about its pivot axis at pivot pin 56 in the clockwise direction, as represented by arrow F'.

With reference to FIG. 5, the cable 6 finally reaches the first and second sharp edges 33 and 34, which can easily cut through the cable 6 in so far as it has already been nicked firstly by the cutter means 21 of the deflector 20, and secondly by the rotary blade 50.

When the cable 6 is of small diameter, e.g. less than 11 mm, once the cable 6 is in the notch 35, it comes into contact with the tapering side 52 of the rotary blade 50, and more precisely with its circularly arcuate zone 52.

As before, the rotary blade 50 turns in the counterclockwise direction. Nevertheless, given its small diameter, the rotary blade does not compress it, and consequently cannot cut through it.

However, the cable 6 continues its travel and ends up by being cut by the first and second sharp edges 33 and 34.

Similarly, when a cable of large diameter is presented in the notch 35, it strikes the obstacle 55 of the rotary blade 50, i.e. the front portion of the rotary blade.

The cable will then cause the rotary blade 52 turn without coming into contact with the tapering side 52 of the rotary blade 50.

As before, the cable 6 continues its travel so as to be cut through by the first and second sharp edges 33 and 34.

Finally, in order to secure the cable-cutter device 10 to the structure of an aircraft, the bottom portion 32 of the jaw 30 is fastened to said structure by conventional means.

Naturally, the present invention can be subjected to numerous variations as to its implementation. Although several embodiments are described above, it should readily be understood that it is not conceivable to identify exhaustively all possible embodiments. It is naturally possible to envisage replacing any of the means described by equivalent means, without thereby going beyond the ambit of the present invention.

The invention claimed is:

1. A cable-cutter device for cutting through cables, the device comprising:
   a jaw having a first portion and a second portion which together define a notch, the notch defined at least in part by:
      first and second stationary and co-operating sharp edges arranged at a downstream end of the notch so as to form an angle between each other, and
      a sliding surface disposed on the first portion of the jaw upstream of the first and second stationary sharp edges; and
   a single rotary blade provided with a body, the body having a tapering side with a sharp section and the body extending from a first end to a second end, the tapering side being at the second end, the first end being fastened to the second portion of the jaw so that the tapering side is arranged in the notch upstream from the first and second sharp edges, the tapering side being proximate the sliding surface and including a concavely arcuate zone, the first and second sharp edges being located in line with the rotary blade, wherein the tapering side of the body of the rotary blade is disposed in the notch prior to operation of the device so as to be present in the notch prior to a cable being introduced into the notch, wherein the sliding surface is a substantially straight surface that extends past the rotary blade, and in the notch the tapering surface is opposed to and cooperable with the sliding surface to be able to cut the cable as it moves past the rotary blade and along the sliding surface.

2. A cable-cutter device according to claim 1, wherein the body is arranged at least in part in a setback of the second portion of the jaw.

3. A cable-cutter device according to claim 1, wherein the body is fastened to the second portion of the jaw by a fastener pin about which the body is suitable for turning.

4. A cable-cutter device according to claim 1, wherein since the rotary blade is fastened to the second portion of the jaw of the device, at least a fraction of the tapering side of the rotary blade presents an angle relative to the sliding surface.

5. A cable-cutter device according to claim 1, wherein the arcuate zone is a circularly arcuate zone, and wherein the tapering side further includes a straight zone followed by the circularly arcuate zone, the straight zone being situated upstream from the circularly arcuate zone.

6. A cable-cutter device according to claim 1, wherein the body projects in part into the notch to present an obstacle upstream from the tapering side that is suitable for coming into contact with a cable.

7. A cable-cutter device according to claim 1, including return means for returning the rotary blade and suitable for keeping the rotary blade in an initial position, in the absence of any cable.

8. A cable-cutter device according to claim 7, wherein since the body is fastened to the second portion of the jaw, the return means comprise a spring arranged between the body of the rotary blade and the second portion of the jaw.

9. A cable-cutter device according to claim 1, including at least one deflector suitable for directing a cable towards the notch.

10. A cable-cutter device according to claim 9, wherein a leading edge of the deflector presents cutter means.

11. A cable-cutter device according to claim 10, wherein the cutter means comprise a stationary blade provided with a cutting edge in the form of waves, the waves comprising a succession of projections and recesses.

12. A cable-cutter device for cutting through cables, said the device comprising:
  a jaw having a first portion and a second portion which together define a notch, the notch defined at least in part by:
    first and second stationary and co-operating sharp edges arranged at a downstream end of the notch so as to form an angle between each other, and
    a sliding surface arranged on the first portion of the jaw; and
  a rotary blade provided with a body, the body having a tapering side with a sharp section, the tapering side including a concavely arcuate profile and being positioned proximate the sliding surface, the body being fastened to the second portion of the jaw so that the tapering side is arranged in the notch upstream from the first and second sharp edges, the first and second sharp edges being located in line with the rotary blade, wherein the tapering side of the rotary blade is
    (i) disposed within the notch in a first position prior to operation of the device for being present in the notch prior to engagement with a cable, and
    (ii) movable to a second position within the notch when engaged with the cable,
  wherein when the rotary blade is in the second position, the tapering side is pivoted closer toward the first and second sham edges than when in the first position, and
  wherein the sliding surface is a substantially straight surface that extends past the rotary blade, and in the notch the tapering surface is opposed to and cooperable with the sliding surface to be able to cut the cable as it moves past the rotary blade and along the sliding surface.

13. A cable-cutter device according to claim 12, wherein the rotary blade is biased toward the first position, such that the rotary blade pivots towards the first position after being disengaged from the cable.

14. The cable-cutter device according to claim 12, wherein the tapering side has a first portion, a second portion, and third portion, the first portion extending in a first direction, the second portion extending in a second direction, and the third portion being a concave curve joining the first and second portions.

15. The cable-cutter device according to claim 12, wherein the rotary blade is a single rotary blade, and wherein the cable-cutter device comprises no other rotary blade.

16. A cable-cutter device for cutting through cables, the device comprising:
  a jaw having a top portion and a bottom portion which together define a notch, the notch defined at least in part by first and second stationary and co-operating sharp edges arranged at a downstream end of the notch so as to form an angle between each other; and
  a rotary blade pivotally disposed on one of the portions of the jaw, the rotary blade having a body, the body having a tapering side with a sharp section, the body disposed in the notch so that the tapering side of the rotary blade is disposed in the notch upstream from the first and second sharp edges, the tapering side having a first portion, a second portion, and third portion, the first portion extending in a first direction, the second portion extending in a second direction, and the third portion being a concave curve joining the first and second portions, the first and second sharp edges being located in line with the rotary blade, wherein the tapering side of the rotary blade is
    (i) disposed within the notch in a first position prior to operation of the device for being present in the notch prior to engagement with a cable, and
    (ii) movable to a second position in the notch when engaged with the cable,
  wherein when the rotary blade is in the second position, the tapering side is pivoted closer toward the first and second sharp edges than when in the first position,
  wherein the rotary blade is a single rotary blade,
  wherein the sliding surface is a substantially straight surface that extends past the rotary blade, and in the notch the tapering surface is opposed to and cooperable with the sliding surface to be able to cut the cable as it moves past the rotary blade and along the sliding surface.

17. The cable-cutter device according to claim 16, wherein the rotary blade is biased toward the first position, such that the rotary blade pivots towards the first position after being disengaged from the cable.

18. The cable-cutter device of claim 16, wherein the rotary blade is pivotably fastened about a single pivot pin.

* * * * *